United States Patent
Noda

(10) Patent No.: US 7,307,742 B2
(45) Date of Patent: Dec. 11, 2007

(54) INFORMATION PROCESSING METHOD, INFORMATION PROCESSING APPARATUS, PROGRAM FOR INFORMATION PROCESSING APPARATUS, AND STORAGE MEDIUM

(75) Inventor: Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 890 days.

(21) Appl. No.: 09/953,255

(22) Filed: Sep. 17, 2001

(65) Prior Publication Data

US 2002/0035585 A1     Mar. 21, 2002

(30) Foreign Application Priority Data

Sep. 20, 2000 (JP) ............................. 2000-285297
Sep. 5, 2001 (JP) ............................. 2001-268716

(51) Int. Cl.
    *G06F 15/00*     (2006.01)
(52) U.S. Cl. .................. 358/1.13; 358/1.15; 358/1.16; 358/1.9; 715/520
(58) Field of Classification Search ............. 358/1.13, 358/1.9, 1.15, 1.16; 715/520
    See application file for complete search history.

(56) References Cited

U.S. PATENT DOCUMENTS

| | | | | |
|---|---|---|---|---|
| 5,659,795 A | * | 8/1997 | Duvall et al. ................ | 710/15 |
| 6,149,323 A | * | 11/2000 | Shima ......................... | 400/76 |
| 6,203,220 B1 | * | 3/2001 | Takenoshita et al. ......... | 400/61 |
| 6,513,073 B1 | * | 1/2003 | Kawai et al. ................. | 710/1 |
| 6,542,173 B1 | * | 4/2003 | Buckley ...................... | 715/841 |
| 6,603,565 B1 | * | 8/2003 | Scheidig et al. ............. | 358/1.13 |
| 6,693,720 B1 | * | 2/2004 | Livingston .................. | 358/1.15 |
| 6,707,574 B1 | * | 3/2004 | Freeman et al. ............. | 358/1.9 |

FOREIGN PATENT DOCUMENTS

| | | |
|---|---|---|
| JP | 03-043280 | 2/1991 |
| JP | 07-009733 | 1/1995 |
| JP | 08-142441 | 6/1996 |
| JP | 08-171468 | 7/1996 |

\* cited by examiner

*Primary Examiner*—Twyler Lamb
*Assistant Examiner*—Mark R. Milia
(74) *Attorney, Agent, or Firm*—Fitzpatrick, Cella, Harper & Scinto

(57) ABSTRACT

To perform control so as to acquire a list of print style information stored in an output device, specify a particular piece of print style information in the acquired list, generate print data associated with the specified piece of print style information, and store the generated print data in the output device or output the generated print data from the output device.

18 Claims, 14 Drawing Sheets

BOX LIST INFO TABLE

| NO. | BOX NO. | BOX NAME |
|---|---|---|
| 1 | 1 | PRESIDENT ONLY |
| 2 | 2 | VICE-PRESIDENT ONLY |
| 3 | 3 | SMITH |
| 4 | 4 | MANAGER |
| ⋮ | ⋮ | ⋮ |
| ⋮ | ⋮ | ⋮ |

FIG. 10

UI PRINT STYLE TABLE

| NO. | ITEM | SETTING |
|---|---|---|
| 1 | [JOB] | STORE IN BOX |
| 2 | [BOX NO.] | 3 |
| 3 | [BOX NAME] | SMITH |
| 4 | [USE BOX PRINT STYLE] | ON |
| 5 | [PAPER SIZE] | A4 |
| 6 | [N-UP] | 1-IN-1 |
| 7 | [SIMPLEX/DUPLEX] | SIMPLEX |
| 8 | [BINDING MARGIN] | YES |
| ⋮ | [ ⋮ ] | ⋮ |
| ⋮ | [ ⋮ ] | ⋮ |

FIG. 11

BOX PRINT STYLE REFERENCE TABLE

| NO. | ITEM | SETTING |
|---|---|---|
| 1 | [BOX PRINT STYLE NAME] | BINDING |
| ⋮ | [BOX PRINT STYLE PATH] | ¥¥BOX¥NO-3¥BINDING.SET |

FIG. 12

BOX PRINT STYLE TABLE

| NO. | ITEM | SETTING |
|---|---|---|
| 1 | [PAPER SIZE] | A4 |
| 2 | [N-UP] | 2-IN-1 |
| 3 | [SIMPLEX/DUPLEX] | SIMPLEX |
| 4 | [BINDING MARGIN] | NO |
| ⋮ | [ ⋮ ] | ⋮ |
| ⋮ | [ ⋮ ] | ⋮ |

← JOB-1
　　DATA : 2 PAGES
　　SIDE : 2 SHEETS/2 SIDES
　　PRINT STYLE : A4, 1-IN-1, SIMPLEX,
　　　　　　　　　　BINDING MARGIN-YES···

← JOB-2
　　DATA : 6 PAGES
　　SIDE : 3 SHEETS/3 SIDES
　　PRINT STYLE : A4, 2-IN-1, SIMPLEX,
　　　　　　　　　　BINDING MARGIN-NO···

← JOB-3
　　DATA : 2 PAGES
　　SIDE : 1 SHEET/2 SIDES
　　PRINT STYLE : A4, 1-IN-1, DUPLEX,
　　　　　　　　　　BINDING MARGIN-NO···

FIG. 20

| NO. | ITEM | SETTING |
|---|---|---|
| 1 | [JOB] | PRINT |
| 2 | [BOX NO.] | NULL |
| 3 | [BOX NAME] | NULL |
| 4 | [USE BOX PRINT STYLE] | OFF |
| 5 | [PAPER SIZE] | A4 |
| 6 | [N-UP] | 1 IN 1 |
| 7 | [SIMPLEX/DUPLEX] | SIMPLEX |
| 8 | [BINDING MARGIN] | NO |
| ⋮ | [ ⋮ ] | ⋮ |
| ⋮ | [ ⋮ ] | ⋮ |

INFORMATION PROCESSING METHOD, INFORMATION PROCESSING APPARATUS, PROGRAM FOR INFORMATION PROCESSING APPARATUS, AND STORAGE MEDIUM

BACKGROUND OF THE INVENTION

1. Field of the Invention

The present invention relates to an information processing method, information processing apparatus, information processing program executed by the information processing apparatus, and storage medium storing the program, for use in an information processing system which consists of a host capable of creating print data using fetched print style information and output device connected to the host and capable of performing processing requested by the host.

2. Related Background Art

Conventionally, information processing systems of this type use a box print function. The box print function works as follows.

The user creates print data using a printer driver, etc. on a host such as the one shown in FIG. 5 and outputs (stores) the created data to a storage called a box on an apparatus (hereinafter referred to as the printer) shown in FIG. 5. There can be two or more such boxes, which are allocated to individuals, departments, or the like according to their application or use. For example, "Job-1," "Job-2," and "Job-3," in FIG. 15 show how the user wants to store jobs in a box allocated to him/her. By selecting a stored print job by a desired method (by an instruction from a printer panel, an instruction from host utility, or the like) at a desired time and printing it on paper, the user obtains an output such as the one shown in FIG. 13.

Such a print box function offers high convenience and working efficiency as described below.

Specifically, the print box function allows more than one item of print data stored by the user to be output in batches, eliminating the need to fetch each outputted job. Also, it prevents an output from being mixed with other users' outputs when a printer is shared by multiple users. Moreover, it allows stored print data to be reused at high speed.

However, the print box function in conventional systems has the following disadvantage.

Specifically, when print data stored by the user is output in batches, the conventional print box function provides poor alignment and viewability if different jobs have different print styles as shown in FIG. 13. This disadvantage is especially notable if multiple users store print data in a common box for a department. To unify print styles, printing must be performed from the host again, which lowers working efficiency.

On the other hand, there is an approach that involves registering print style items using a printer driver to unify the style of print jobs received from a host and stored in a box. However, if a single user has two or more hosts and stores print jobs from them in a box, he/she must register print style items for each host manually, for example, using a mouse. The same is true if a system administrator manages two or more hosts. Besides, to change any print style item once registered (for example, to change from simplex printing to duplex printing), the user must make modifications for every host manually, for example, using a mouse. This lowers working efficiency. Furthermore, when a single host is used by two or more users, it is troublesome and inconvenient to manage the print styles registered. Specifically, if a user wants to create jobs in a unified print style on a host located remotely from a printer and store them in a box, once default print style settings on the host are changed, the user is forced to perform a troublesome task of remembering any previous print style settings he/she wants to restore.

The present invention has been made in view of the problems with the prior art described above. One of its objects is to provide an information processing method and information processing apparatus which provide improved alignment and viewability of printed matter and allow print jobs to be stored and output always in the same print style, resulting in improved working efficiency.

Another object of the present invention is to provide a program intended to control the information processing method of the present invention and executable by a computer as well as a storage medium storing the program in a computer-readable format.

SUMMARY OF THE INVENTION

To achieve the above objects, the present invention provides an information processing method carried out in an information processing apparatus capable of communicating with an output device having a plurality of box areas, to which respective print setting information is set, for storing received print data without printing the print data until a print instruction is given. The method includes: (1) a setting step of setting print setting information to be applied to print data to be generated; (2) a specifying step of specifying a box area from the plurality of box areas; (3) a display control step of displaying the print setting information set to the box area specified in the specifying step; (4) a designation step of designating execution of a print process based on the print setting information displayed in the display control step; and (5) a generating step of, when the execution of the print process is designated in the designation step, generating the print data which includes (a) instruction information for causing the output device to execute the print process based on the print setting information set to the box area specified in the specifying step and (b) the print setting information set in the setting step, and on the other hand, when the execution of the print process is not designated in said designation step, generating the print data based on the print setting information set in the setting step, wherein the generating step generates the first print data such that the output device executes the print process based on the print setting information set to the box area specified in the specifying step, without executing the print process based on the print setting information set in the setting step, in response to an instruction for printing the first print data stored in the specified box area; and an apparatus and computer program therefor.

Other objects and features of the present invention will be apparent from the following description taken in conjunction with the accompanying drawings.

BRIEF DESCRIPTION OF THE DRAWINGS

FIG. 9 is a diagram showing an example of the internal data structure of the operating screen for specifying a print style according to the first embodiment of the present invention;

FIG. 10 is a diagram showing a print style table according to the first embodiment of the present invention;

FIG. 11 is a diagram showing a print style table according to the first embodiment of the present invention;

FIG. 12 is a diagram showing a print style table according to the first embodiment of the present invention;

FIG. 20 is a diagram showing the default look of an IU print style table according to the first embodiment of the present invention.

DESCRIPTION OF THE PREFERRED EMBODIMENTS

Embodiments of the present invention will be described below with reference to the drawings.

First Embodiment

A first embodiment of the present invention will be described first with reference to FIGS. 1 to 19.

Figure 5:
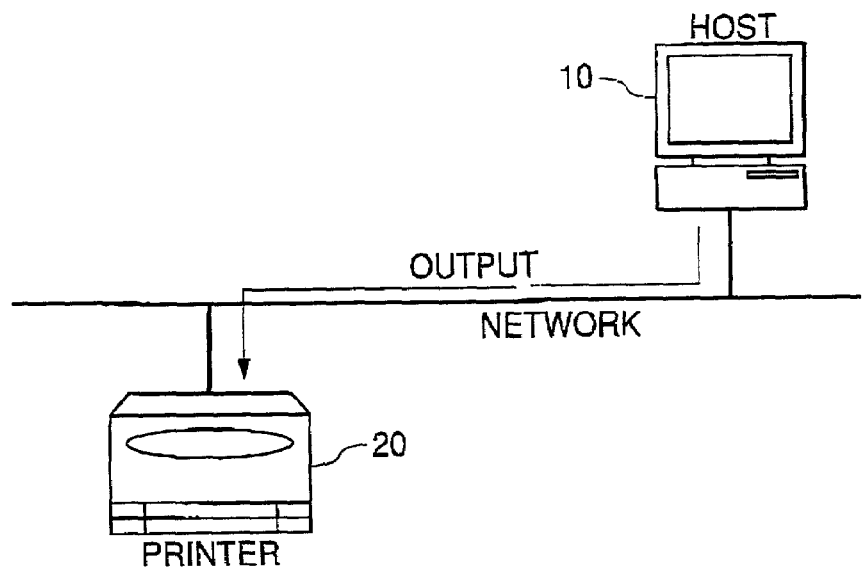
FIG. 5 is a conceptual diagram illustrating a print method according to the first embodiment of the present invention.
Figure 6:
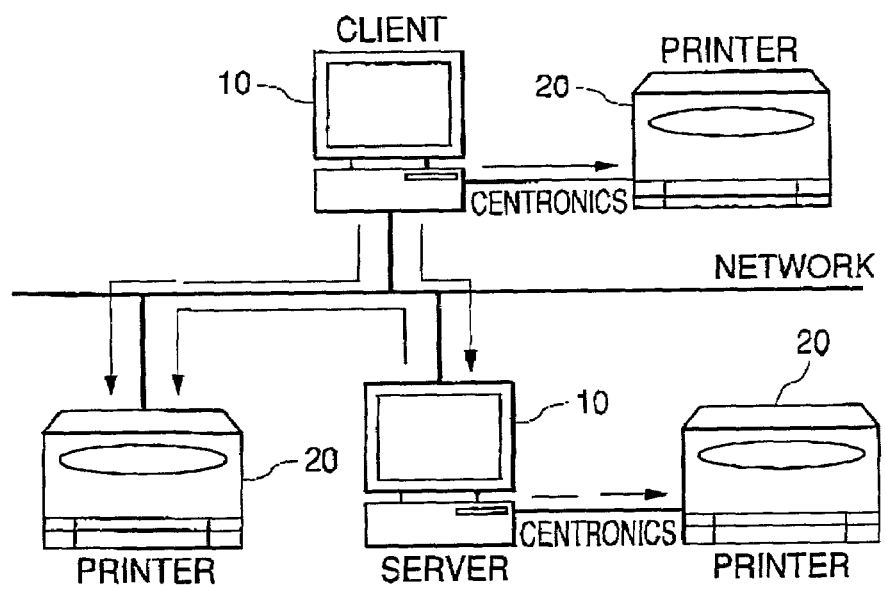
FIG. 6 is a conceptual diagram illustrating a print method according to the first embodiment of the present invention.

The following description assumes that the printer in FIG. 5 is provided with the functions necessary to process requests from a host. Regarding connection topologies, the host and printer may be connected in a one-to-one relationship as shown in FIG. 6 or the printer may be connected to a print server.

Figure 1:
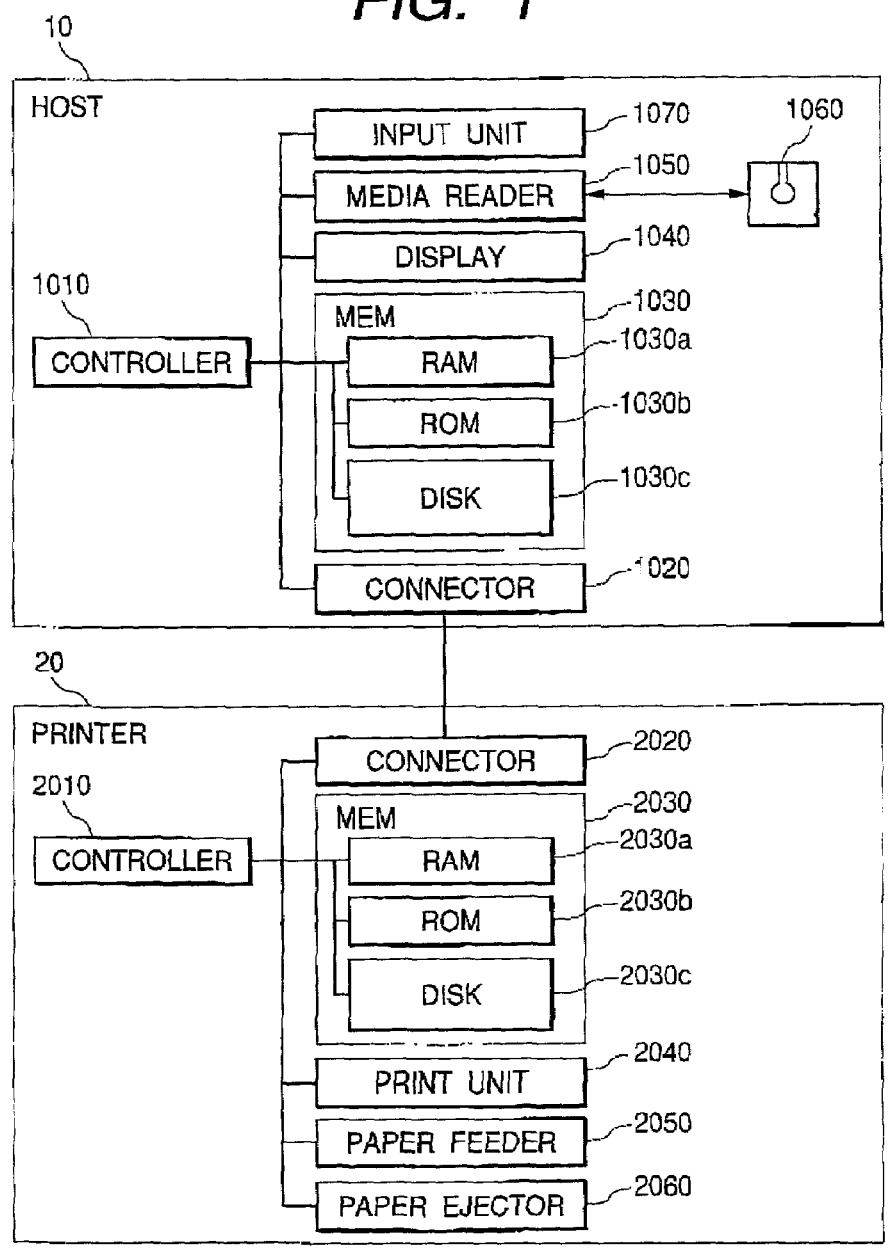
FIG. 1 is a diagram showing the configuration of an information processing system in which an information processing apparatus and output device according to a first embodiment of the present invention are connected in such a way as to allow communication between them.

FIG. 1 is a block diagram showing the configuration of an information processing system including an information processing apparatus according to the first embodiment of the present invention. In the figure, reference numeral 10 denotes a host, which is an information processing apparatus while reference numeral 20 denotes a printer, which is an output device.

The host 10 has the configuration of a typical information processing apparatus. It comprises, a controller 1010, connector 1020, MEM 1030, display 1040, media reader 1050, recording medium 1060, and input unit 1070. The MEM 1030 comprises a RAM (random access memory) 1030a, ROM (read-only memory) 1030b, and disk 1030c.

The printer 20 (output device 20) comprises a means of image formation as well as a controller 2010, connector 2020, MEM 2030, print unit 2040, paper feeder 2050 and paper ejector 2060. The MEM 2030 comprises a RAM (random access memory) 2030a, ROM (read-only memory) 2030b, and disk 2030c. The type of printer 20 in the present invention is not limited in particular. Needless to say, the present invention can employ laser beam printers based on an electrophotographic method; ink jet printers based on an ink jet method; digital compound machines with fax, copy, and network printer functions; fax machines; or digital copiers as well.

The information processing system including the Information processing apparatus according to this embodiment is constructed by interconnecting the connector 1020 of the host 10 and the connector 2020 of the printer 20.

It is assumed that modules implementing the present invention have been installed on the disk 1030c in the MEM 1030 of the host 10 and are loaded into the RAM 1030a in the MEM 1030 of the host 10 when the host 10 is started.

Figure 16:
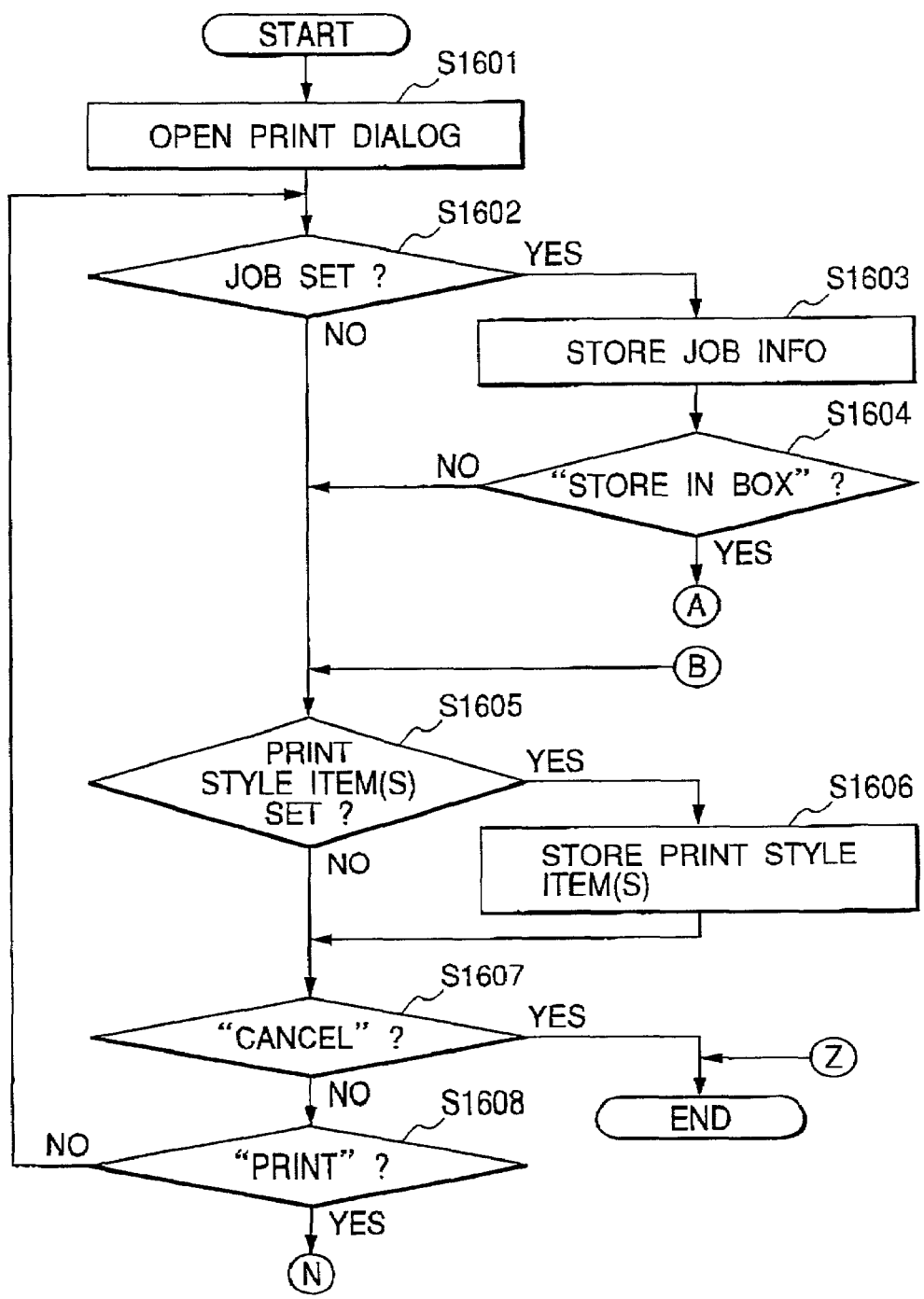
FIG. 16 is a flowchart showing a flow of control actions on the information processing apparatus according to the first embodiment of the present invention.
Figure 17:
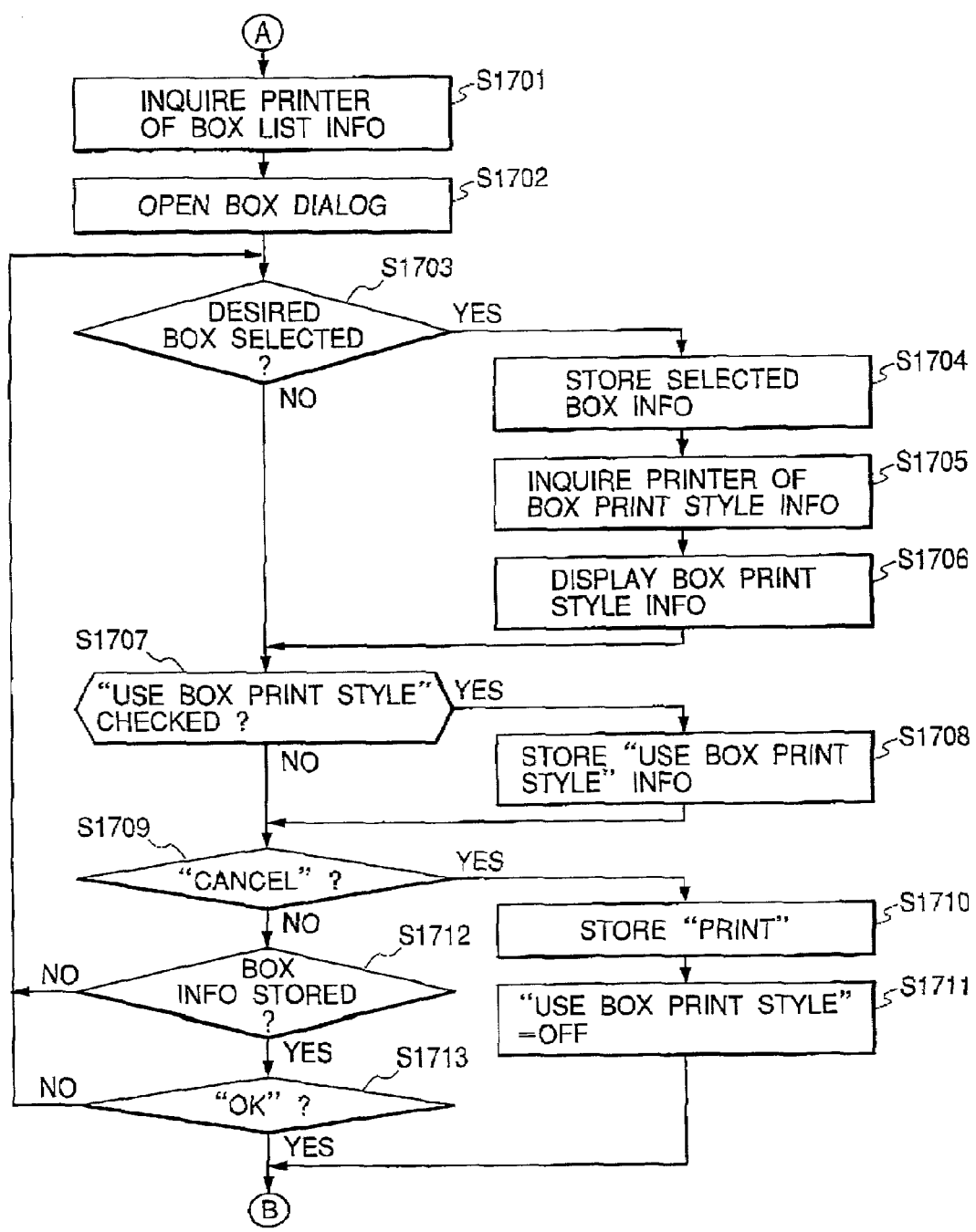
FIG. 17 is a flowchart showing a flow of control actions on the information processing apparatus according to the first embodiment of the present invention.
Figure 18:
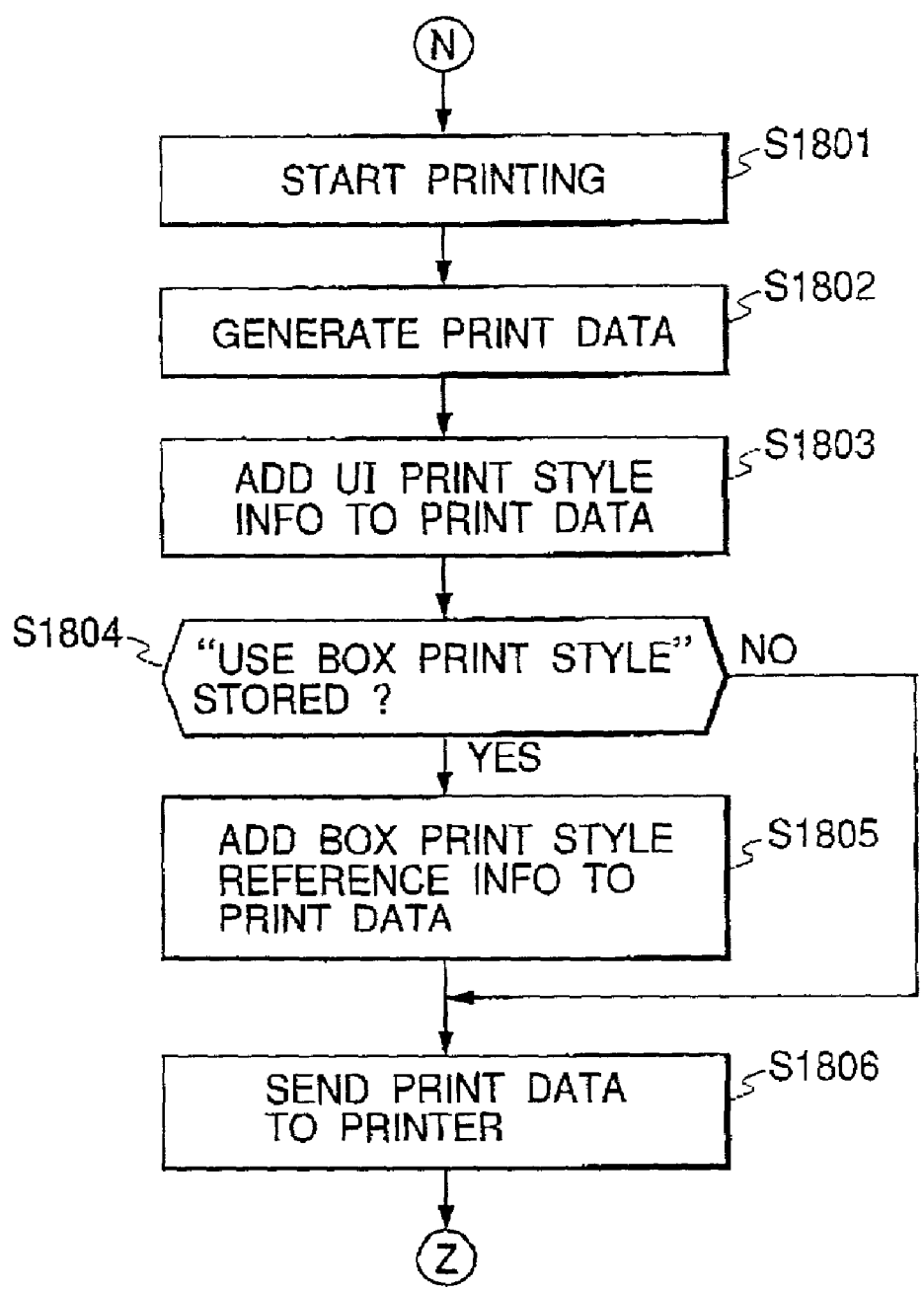
FIG. 18 is a flowchart showing a flow of control actions on the information processing apparatus according to the first embodiment of the present invention.

The modules implementing the present invention have been programmed according to the flowchart shown in FIGS. 16 to 18. The modules in FIGS. 16 to 18 have been installed on the host 10 and the module in FIG. 19 has been installed on the output device 20.

It is also possible to execute the modules implementing the present invention and related data by loading them into the host 10 from the media reader 1050 of the host 10.

Figure 2:
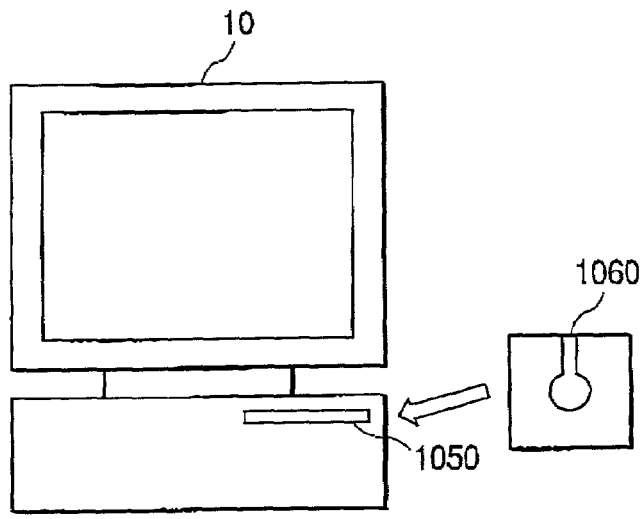
FIG. 2 is a diagram showing typical examples of the information processing apparatus and a recording medium according to the first embodiment of the present invention.

FIG. 2 is a front view of a PC (personal computer) serving as the host 10, i.e., the information processing apparatus of this embodiment. The modules implementing the present invention and related data have been recorded in the recording medium 1060 and the recorded content has the configuration shown in FIG. 4.

Figure 4:
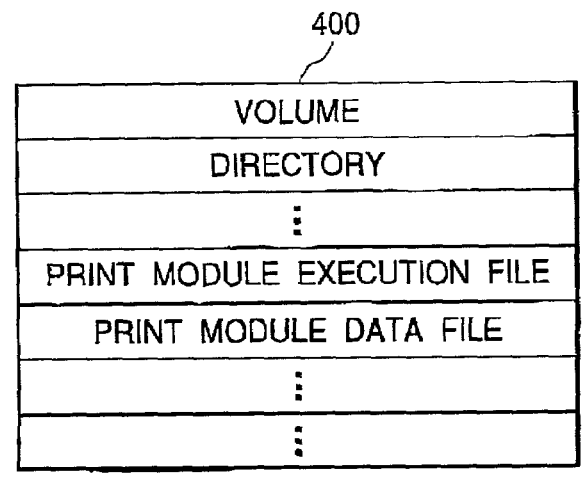
FIG. 4 is a diagram showing the configuration of a recording medium storing the module according to the first embodiment of the present invention.

FIG. 4 is a diagram showing the configuration of the content of the recording medium 1060. The recorded content 400 consists, for example, of volume information, directory information, a print module execution file, a print module data file, etc.

The modules implementing the present invention and related data recorded in the recording medium 1060 can be loaded into the host 10 via the media reader 1050 shown in FIG. 2.

When the recording medium 1060 is inserted in the media reader 1050 of the host 10, the modules implementing the present invention and related data are read from the recording medium 1060 and loaded into the RAM 1030a in the MEM 1030 of the host 10 under the control of an OS (operating system) and basic I/O program to get ready for operation.

Figure 3:
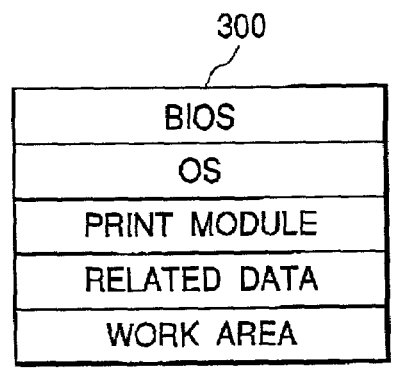
FIG. 3 is a diagram showing a memory map during the operation of a module according to the first embodiment of the present invention.

FIG. 3 is a diagram showing the configuration of a memory map when the modules implementing the present invention and related data are ready for operation after being loaded into the RAM 1030a in the MEM 1030 of the host 10. As shown in the figure, the memory map 300 consists of BIOS, an OS, a print module related data, a work area, etc.

Incidentally, the modules implementing the present invention and related data recorded in the recording medium 1060 may be installed on the disk 1030*c* in the MEM 1030 of the host 10 or the like and then loaded into the RAM 1030*a* in the MEM 1030 of the host 10 from the disk 1030*c* in the MEM 1030 of the host 10 or the like when they are operated.

Also, the description herein is based on the following assumptions.

FIG. 5 shows the host 10 and printer 20 connected via a network. It is assumed that the printer 20 in FIG. 5 is provided with a box print function which allows the user to create print data using a printer driver, etc. on the host 10, output it to the printer 20 MEM (storage) 2030 called a box, select a stored print job according to an instruction from an equipment panel, host 10 utility, or the like at a desired time, and print it on a print medium such as paper.

According to this embodiment, print data refers to data in the formats interpretable by the printer 20. Examples of data in the formats interpretable by the printer 20 include, page-description language (PDL) data, image data obtained by converting application data into bitmap data, and various other types of data.

Figure 15:
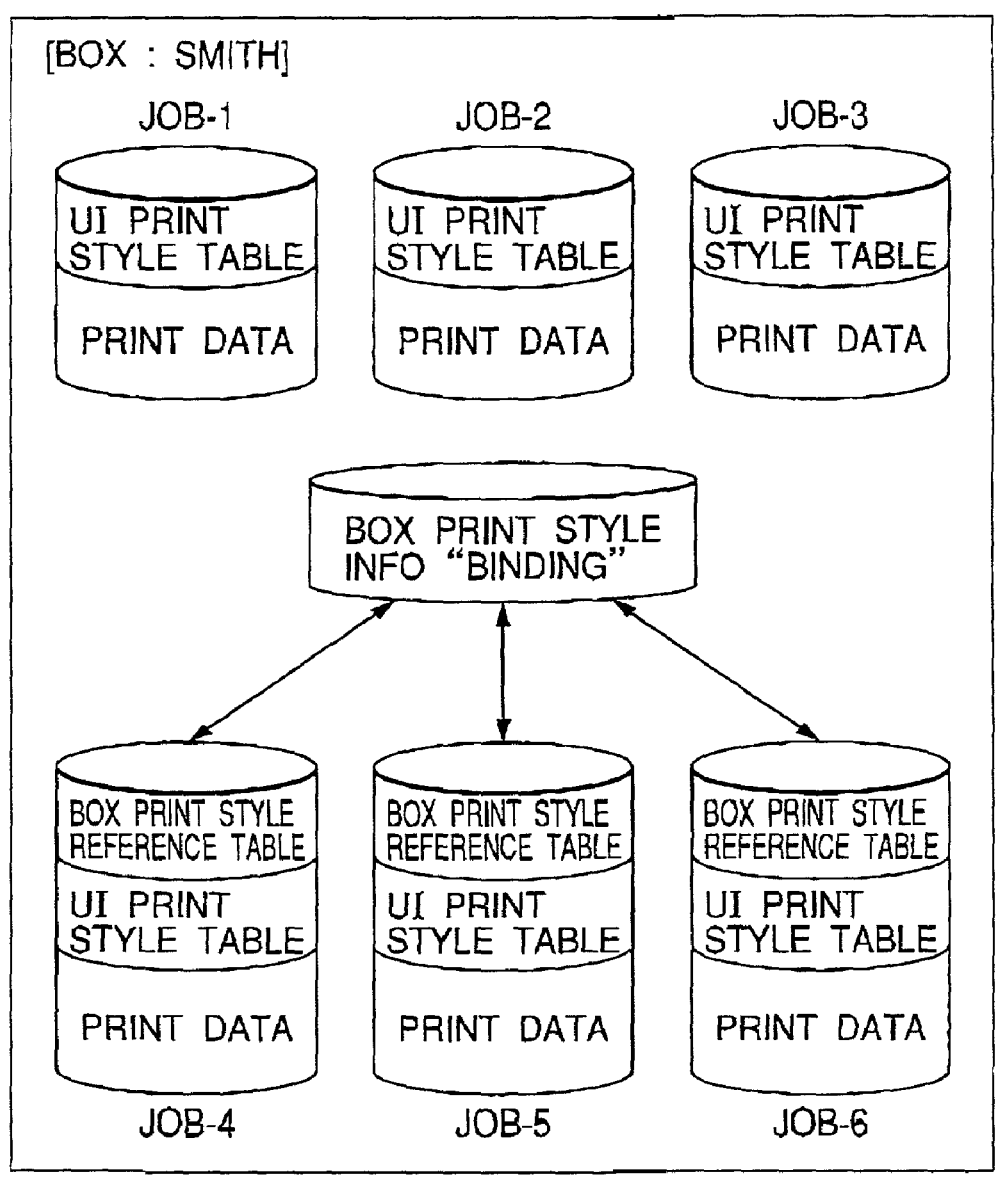
FIG. 15 is a diagram showing how print data with print style information attached is stored according to the first embodiment of the present invention.

A box list info table with a data structure like the one shown in FIG. 9 is stored on the disk 2030*c* in the MEM 2030 of the printer 20. Also, box print style tables with a data structure like the one shown in FIG. 12 are stored on the disk 2030*c*, which functions as a box, in the MEM 2030 of the printer 20. The configuration of the box is shown in FIG. 15.

Based on the above description, the information processing system including the information processing apparatus according to this embodiment will be described now.

The process flow of the host 10 or output device 20 shown in FIG. 5 will be described with reference to the flowcharts in FIGS. 16 to 19.

First, description will be given with reference to FIG. 16. The processes of the steps in the flowchart in FIG. 16 are implemented when a CPU (controller 1010) provided in the host 10 executes processes based on program code read from non-volatile storage means such as a ROM or hard disk.

Figure 7:
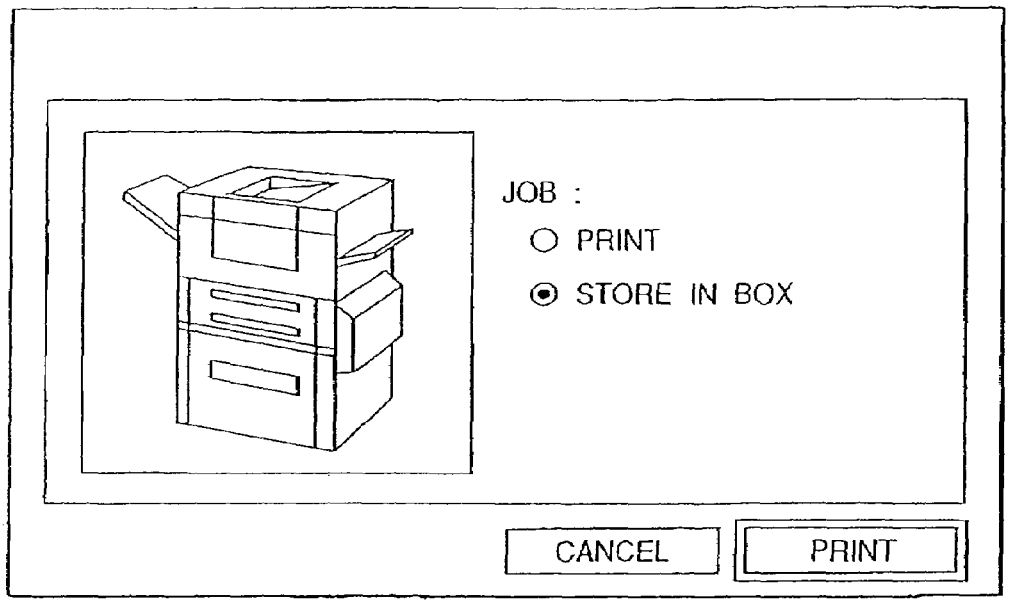
FIG. 7 is a diagram showing an operating screen for printing according to the first embodiment of the present invention.

In Step S1601, a print dialog such as the one shown in FIG. 7 is displayed on the display 1040 of the host 10 shown in FIG. 1. The print dialog shown in FIG. 7 indicates the print method specified by the user on the host 10 shown in FIG. 5 and corresponds to the appearance of a software (printer driver, etc.) screen used by the host to create print data.

In Step S1602, the controller 1010 of the host 10 judges whether a job processing method was specified (changed) via the print dialog in FIG. 7. If it is judged that a job processing method was not specified, the controller 1010 of the host 10 goes to Step S1605. If it is judged that a job processing method was specified, the controller 1010 of the host 10 goes to Step S1603. The judgment as to whether a job processing method was specified comes down to a judgment whether the selection of "Print" or "Store in Box" shown in FIG. 7 was changed at the user's instruction. The default value before the change corresponds to the setting of No. 1 "Job" in a UI print style table such as the one shown in FIG. 10.

If "Print" in FIG. 7 is specified for transmitted data, the data is printed immediately. On the other hand, if "Store in Box" in FIG. 7 is specified for print data or image data sent from the host 10 or output device 20, no image formation process is carried out and the transmitted data is saved in the nonvolatile storage means (box) provided in the output device.

In Step S1603, the controller 1010 of the host 10 stores information about the item specified (changed) in Step S1602 above in the RAM 1030*a* in the MEM 1030 of the host 10, using the data structure of the UI print style table such as the one shown in FIG. 10, and then goes to Step S1604. Specifically, in Step S1603, information corresponding to "Print" or "Store in Box" (in FIG. 7) selected in Step S1602 is set for Item No. 1 "Job" in FIG. 10.

Now, the UI print style table shown in FIG. 10 will be described in more detail. This table stores various data (settings) referenced during printing. FIG. 20 shows an example where the items in the table contain default values. FIG. 20 is only exemplary and the previous settings stored in the host or the like, for example, may be displayed by default in the UI print style table shown in FIG. 10.

In Step S1604, the controller 1010 of the host 10 judges whether "Store in Box" is checked. If it is judged that "Store in Box" is checked, the controller 1010 of the host 10 goes to Step S1701 in FIG. 17. On the other hand, if it is judged in Step S1604 above that "Store in Box" is not checked, the controller 1010 of the host 10 goes to Step S1605. Incidentally, if "Store in Box" is not checked, this means that "Print" has been selected as the job processing method in FIG. 7.

In Step S1605, the controller 1010 of the host 10 judges whether any print style item is specified. Print style items including Paper Size, N-up (capability to lay out multiple pages on a single page), Simplex/Duplex, and Binding Margin are presented in a print dialog similar to the one shown in FIG. 7 and the user is supposed to specify them using the input unit 1070 of the host 10 such as the one shown in FIG. 1.

If it is judged in Step S1605 above that no print style item is specified, the controller 1010 of the host 10 goes to Step S1607. If it is judged that any print style item is specified, the controller 1010 goes to Step S1606.

In Step S1606, information about the items specified (changed) in Step S1605 are stored in the RAM 1030*a* in the MEM 1030 of the host 10 using the data structure of the UI print style table such as the one shown in FIG. 10. Then, the controller 1010 of the host 10 goes to Step S1607.

In Step S1607, the controller 1010 of the host 10 judges whether a "Cancel" button was selected using the input unit 1070 of the host 10 such as the one shown in FIG. 1. If it is judged that the "Cancel" button was selected, the controller 1010 of the host 10 stops the printing process. On the other hand, if it is judged in Step S1607 above that the "Cancel" button was not selected, the controller 1010 of the host 10 goes to the next step, S1608.

In Step S1608, the controller 1010 of the host 10 judges whether a "Print" button was selected using the input unit 1070 of the host 10 such as the one shown in FIG. 1. If it is judged that the "Print" button was selected, the controller 1010 of the host 10 goes to Step S1801 in FIG. 18. If it is judged that the "Print" button was not selected, the controller 1010 of the host 10 returns to Step S1602 above.

Next, description will be given with reference to FIG. 17. Incidentally, the processes of the steps in the flowchart in FIG. 17 are implemented when the CPU (which corresponds to the controller 1010) provided in the host 10 executes processes based on program code read from non-volatile storage means such as a ROM or hard disk.

In Step S1701, the controller 1010 of the host 10 inquires the printer 20 of box list information. Specifically, the controller 1010 sends a control command to the controller 2010 of the printer 20 via the connector 1020 of the host 10 shown in FIG. 1 to acquire information (box number, box name, etc.) contained in each box stored in the printer 20.

In Step S1702, the controller 1010 of the host 10 receives a box list info table in the format shown in FIG. 9 as a response from the printer 20 and stores it in the RAM 1030a in the MEM 1030. Next, the controller 1010 of the host 10 analyzes the box list info table stored in the RAM 1030a in the MEM 1030 and based on the resulting information, it displays a box selection dialog such as the one shown in FIG. 8 on the display 1040 of the host 10 such as the one shown in FIG. 1. Incidentally, the print style information shown in 801 in FIG. 8 corresponds to information stored in the host 10 in advance. Naturally, if no such information is stored in the host 10, no information will be provided in 801.

Figure 8:
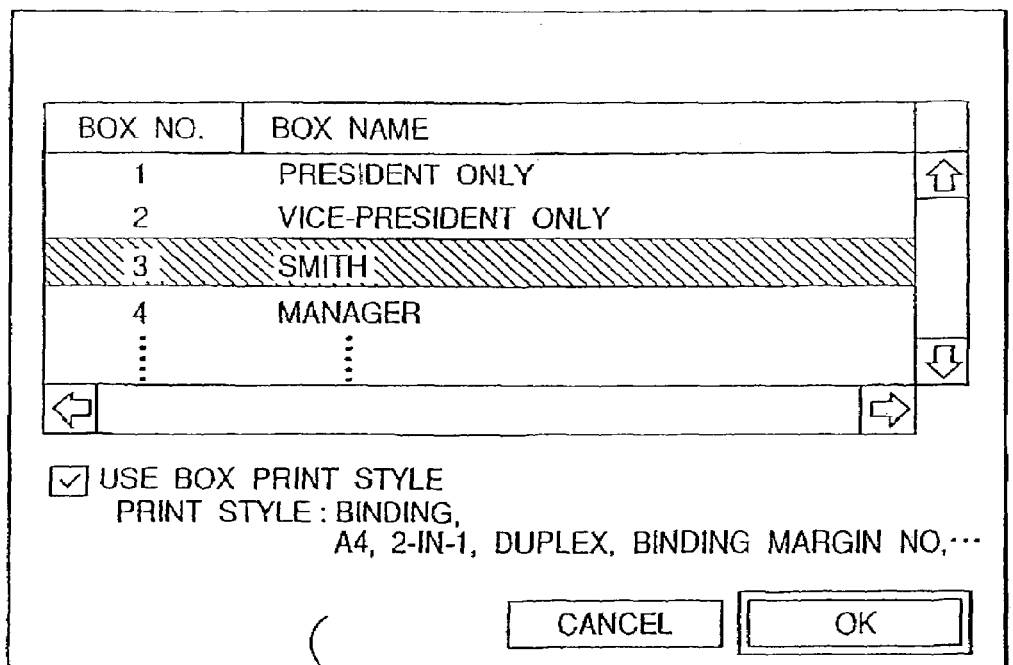
FIG. 8 is a diagram showing an operating screen for specifying a print style according to the first embodiment of the present invention.

In Step S1703, the controller 1010 of the host 10 judges whether any box is selected in Step S1702 via the selection dialog such as the one shown in FIG. 8 displayed on the display. If it is judged that no box is selected, the controller 1010 of the host 10 goes to Step S1707. If it is judged that any box is selected, the controller 1010 goes to Step S1704. To select a box here means to indicate a box name in the list via input means. According to one conceivable form, a selection signal may be entered in the host via the input means and the host may control selection/deselection each time the selection signal is entered. In the box selection dialog shown in FIG. 8, "Box Name: SMITH" is selected.

In Step S1704, the controller 1010 of the host 10 stores selected information ("Box No." and "Box Name" information) in the RAM 1030a in the MEM 1030 as settings of "Box No." and "Box Name" using the data structure of the UI print style table such as the one shown in FIG. 10, and then it goes to the next step, S1705.

In Step S1705, the controller 1010 of the host 10 inquires about the box print style information stored in the box ("Box No. 3," "Box Name: SMITH" in this case) specified in Step S1703 in FIG. 17 above. Specifically, the controller 1010 of the host 10 transfers a control command to the controller 2010 of the printer 20 via the connector 1020 of the host 10 and connector 2020 of the printer 20 shown in FIG. 1 to acquire the print style information specified in Step S1703 out of the print style information (paper size, N-up, etc.) contained in each box stored in the printer 20. Also, this may be implemented in another form. Specifically, the host 10 may acquire multiple pieces of print style information stored in the printer 20 and then identify a particular piece of print style information. In that case, the inquiry in Step S1705 will be directed to the host 10 itself.

Also, in addition to storing print style information in each box in the printer 20, it is possible to prestore print style information in a particular memory in the printer 20 to accommodate requests from the host 10. Besides, the present invention may take a form in which print style information to be supplied in response to requests from the host 10 will be stored in an information processing apparatus other than the printer 20.

In Step S1706, the controller 1010 of the host 10 receives a box print style reference table such as the one shown in FIG. 11 and box print style table such as the one shown in FIG. 12 as a response from the printer 20 and stores them in the RAM 1030a in the MEM 1030. In this case, the printer 20 has a search table for identifying what (print style information) to return in response according to "Box No." or "Box Name" received from the host 10. However, the present invention is not limited to this. The request for a particular print style table made by the host 10 to the printer 20 needs to contain only the information necessary for the printer 20 to identify the particular print style table. The host 10 can acquire the print style information desired by the user from the printer 20. Next, the controller 1010 of the host 10 analyzes the contents of the box print style reference table and box print style table stored in the RAM 1030a in the MEM 1030 and based on the resulting information, it displays a box selection dialog such as the one shown in FIG. 8 on the display 1040 of the host 10 such as the one shown in FIG. 1. Then it goes to the next step, S1707. Incidentally, the content of the box print style table acquired by the controller 1010 of the host 10 from the printer 20 in Step S1706 corresponds to the content of 801 in FIG. 8. Otherwise, the appearance of 801 in Step S1706 differs from the appearance of 801 in Step S1702.

In Step S1707, the controller 1010 of the host 10 judges whether the setting of "Use Box Print Style" was changed. Incidentally, as described above, "Use Box Print Style" defaults to OFF, for example, in the UI print style table shown in FIG. 10. If it is judged that the setting of "Use Box Print Style" in FIG. 8 was not changed, the controller 1010 of the host 10 goes to Step S1709. If it is judged that the setting was changed, the controller 1010 goes to Step S1708.

In Step S1708, the controller 1010 of the host 10 stores the setting ("ON" in this case, indicating that the print style will be used) of "Use Box Print Style" in the RAM 1030a in the MEM 1030 using the data structure of the UI print style table such as the one shown in FIG. 10, and then it goes to Step S1709

In Step S1709, the controller 1010 of the host 10 judges whether a "Cancel" button was selected using the input unit 1070 of the host 10 such as the one shown in FIG. 1. If it is judged that the "Cancel" button was not selected, the controller 1010 goes to Step S1712. On the other hand, if it is judged the "Cancel" button was selected, the controller 1010 goes to Step S1710.

In Step S1710, "Print" is stored for item "Job" in the RAM 1030a in the MEM 1030 using the data structure of the UI print style table such as the one shown in FIG. 10. Then the controller 1010 of the host 10 goes to Step S1711.

In Step S1711, the controller 1010 of the host 10 stores "OFF" for "Use Box Print Style," indicating that the print style will not be used, in the RAM 1030a in the MEM 1030 using the data structure of the UI print style table such as the one shown in FIG. 10, and then it goes to Step S1605 in FIG. 16 above.

In Step S1712, the controller 1010 of the host 10 judges whether box information is stored, referring to Item Nos. 2 and 3 of the UI print style table such as the one shown in FIG. 10 stored in the RAM 1030a in the MEM 1030, If it is judged that box information is not stored, the controller 1010 of the host 10 returns to Step S1703. If it is judged that box information is stored, the controller 1010 goes to Step S1713.

In Step S1713, the controller 1010 of the host 10 judges whether an "OK" button was selected using the input unit 1070 of the host 10 such as the one shown in FIG. 1. If it is judged that the "OK" button was not selected, the controller 1010 of the host 10 returns to Step S1703 above. On the other hand, if it is judged the "OK" button was selected, the controller 1010 goes to Step S1605 in FIG. 16 above.

In this way, if the processes shown in the flowchart of FIG. 17 are implemented, the user can use print style information stored in remote devices, on the host as required.

The capability to select any of preset print style information via the selection dialog shown in FIG. 8 provides the user easy remote access to various print style information.

When using the dialog box shown in FIG. 8, since the user can view different print style information by selecting a different box name in 801, he/she can easily select desired print style information out of various print style information.

If a plurality of hosts are connected to the output device 20 in such a way as to allow communication, shared print style information (e.g., print style information corresponding to a box name "Print Style") can be provided on the box selection dialog in FIG. 8, making it easy to create print data with a unified print style attached even if a plurality of remote users work on their own hosts. This helps reduce the burden on users: in an environment in which a plurality of hosts are connected remotely to a printer via communications lines, when the plurality of hosts store unified jobs in printer boxes, there is no need to store unified print style information in each host before a printing process manually, for example, by pointing with a mouse.

Next, description will be given with reference to FIG. 18. Incidentally, the processes of the steps in the flowchart in FIG. 18 are implemented when the CPU (which corresponds to the controller 1010) provided in the host 10 executes processes based on program code read from non-volatile storage means such as a ROM or hard disk.

In Step S1801, the controller 1010 of the host 10 receives a print request from an application and starts a printing process. In Step S1802, the controller 1010 of the host 10 creates print data and stores it in the disk 1030c in the MEM 1030. In Step S1803, the controller 1010 of the host 10 refers to the UI print style table which has a data structure such as the one shown in FIG. 10 and which is stored in the RAM 1030a in the MEM 1030, and attaches information contained in the table to the print data. The content of the UI print style table attached to the print data in Step S1803 corresponds to preset values or the above-mentioned default values shown in FIG. 10 if no print style item was changed in Step S1605.

In Step S1804, referencing Item No. 4 in the UI print style table which has a data structure such as the one shown in FIG. 10 and which is stored in the RAM 1030a in the MEM 1030, the controller 1010 of the host 10 judges whether the setting of "Use Box Print Style" is stored. If it is judged that the setting ("ON" in the data structure of FIG. 10) of "Use Box Print Style" in FIG. 8 is not stored, the controller 1010 of the host 10 goes to Step S1806. If it is judged that the setting ("ON" in the data structure of FIG. 10) is stored, the controller 1010 goes to Step S1805.

In Step S1805, the controller 1010 of the host 10 refers to the box print style reference table which has a data structure such as the one shown in FIG. 11 and which is stored in the RAM 1030a in the MEM 1030 and attaches information contained in the table to the print data. Then it goes to Step S1806. By performing the processes of Step S1803 and Step S1805, print data can be generated with second print style information added to first print style information as exemplified by Job-4, Job-5, and Job-6 in FIG. 15. By storing the generated print data in a designated box of the output device 20, the user can attach multiple variations of print style information to print data. This allows remote hosts to easily generate jobs in a unified style and with desired print settings added at the same time, In this way, by implementing the processes shown in the flowchart of FIG. 18, it is possible to provide a highly convenient job generation mechanism.

As a more suitable form of Step S1805, it will be possible to attach the print style information itself displayed in Step S1706, i.e., the settings of items such as Paper Size, N-up, Simplex/Duplex, and Binding Margin to the print data which will be sent to the output device 20 and stored therein. Then, even if a box print style table which is searched for through "Box Print Style Path" shown in FIG. 11 has been erased from a box, the print style which was set on the host can be reproduced later.

In Step S1806, the controller 1010 of the host 10 sends the print data to the printer 20, and then ends the printing process.

Figure 19:
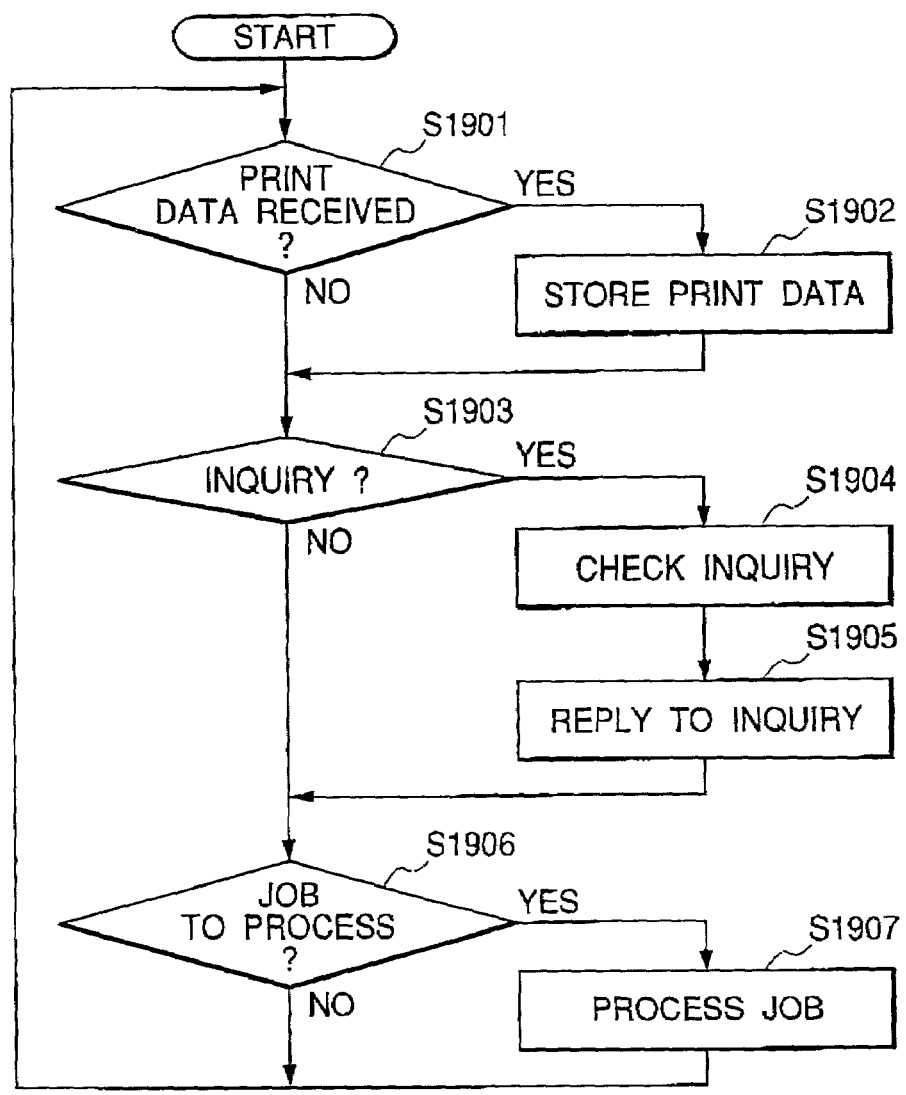
FIG. 19 is a flowchart showing a flow of control actions on the output device according to the first embodiment of the present invention.

Next, description will be given with reference to FIG. 19. Incidentally, the processes of the steps in the flowchart in FIG. 19 are implemented when a CPU (which corresponds to the controller 2010) provided in the output device 20 executes processes based on program code read from non-volatile storage means such as a ROM or hard disk.

In Step S1901, the controller 2010 of the printer 20 judges whether the print data was received. If it is judged that the print data was received, the controller 2010 of the printer 20 goes to Step S1902. If it is judged that the print data was not received, the controller 2010 of the printer 20 goes to Step S1903.

In Step S1902, the controller 2010 of the printer 20 stores the print data on the disk 2030c in the MEM 2030 of the printer 20, and then goes to Step S1903.

In Step S1903, the controller 2010 of the printer 20 judges whether an inquiry was received. If it is judged that an inquiry was received, the controller 2010 of the printer 20 goes to Step S1904. If it is judged that no inquiry was received, the controller 2010 of the printer 20 goes to Step S1906.

In Step S1904, the controller 2010 of the printer 20 checks the content of the inquiry by analyzing received control data and recognizes the received control data as an inquiry about box print style information. In Step S1905, the controller 2010 of the printer 20 returns a box print style reference table such as the one shown in FIG. 11 and a box print style table such as the one shown in FIG. 12 stored on the disk 1030c in the MEM 2030 of the printer 20 such as the one shown in FIG. 1 to the host 10 in response to the inquiry. Then it goes to Step S1906. The information shown in FIG. 11 and information shown in FIG. 12 are linked with each other such that the box print style table in FIG. 12 can be referenced via the box print style path in FIG. 11.

In Step S1906, the controller 2010 of the printer 20 judges whether there is a job to be processed. If it is judged that there is no job to be processed because no print data is stored on the disk 2030c in the MEM 2030 of the printer 20, the controller 2010 returns to Step S1901 above.

On the other hand, if it is judged in Step S1906 that there is a job to be processed, the controller 2010 of the printer 20 goes to Step S1907, processes the job, and returns to Step S1901 above.

Thus, by performing Steps S1601 to S1608 in FIG. 16, Steps S1701 to S1713 in FIG. 17, and Steps S1801 to S1806 in FIG. 15 the following effects can be achieved.

Figure 13:
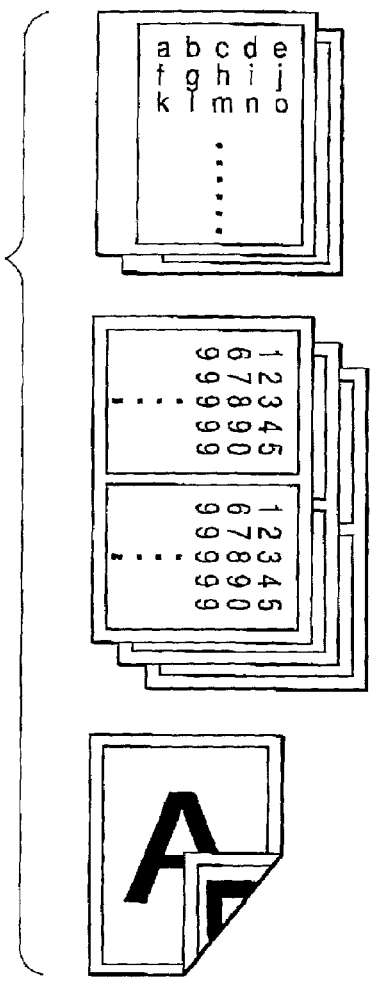
FIG. 13 is a diagram illustrating the correspondence between print style settings and printed output according to the first embodiment of the present invention.
Figure 14:
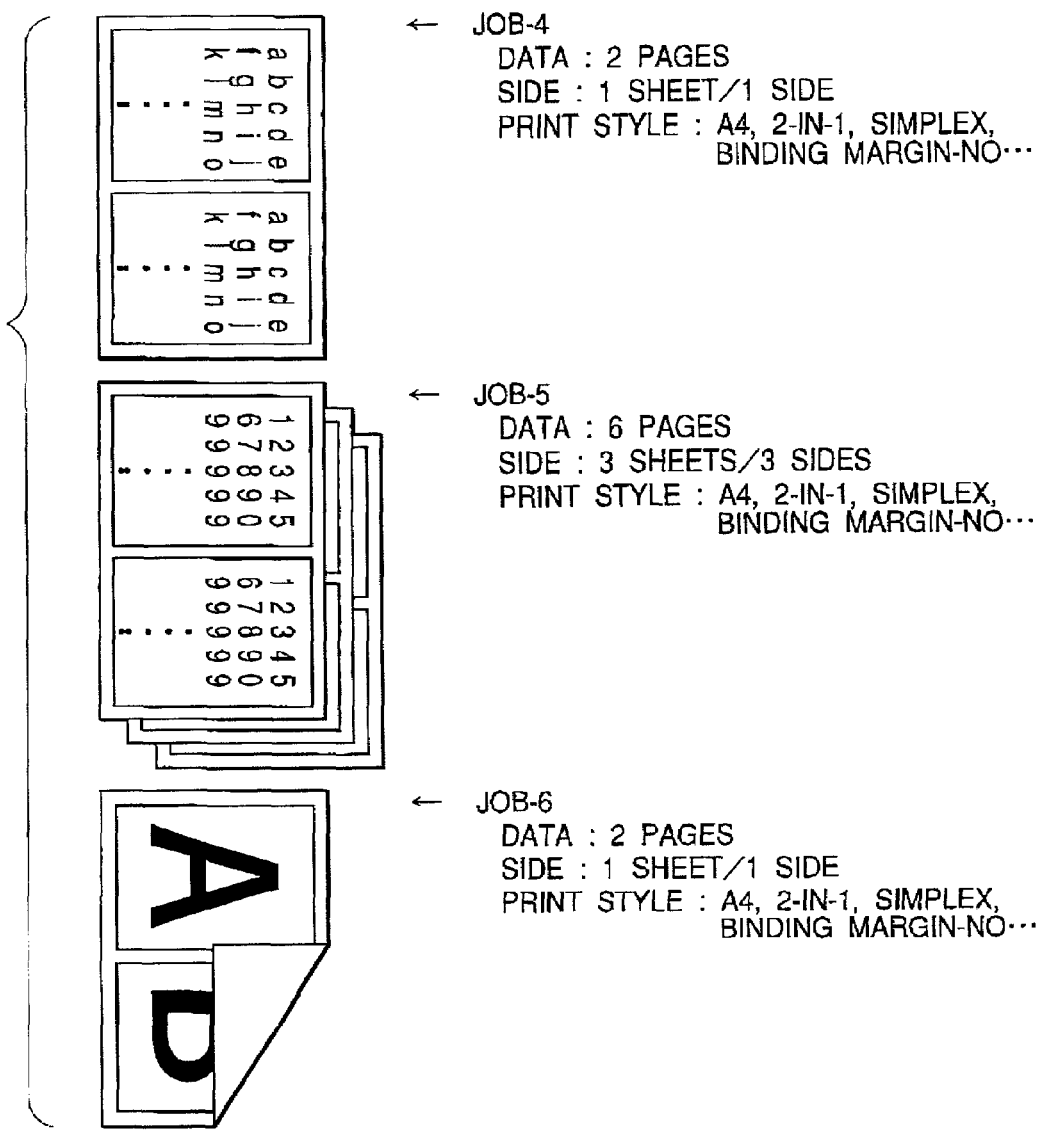
FIG. 14 is a diagram illustrating the correspondence between print style settings and printed output according to the first embodiment of the present invention.

According to the prior art, print jobs are stored in a box in a form represented by Job-1 shown in FIG. 15 and outputted in a form represented by Job-1 shown in FIG. 13 in response to a print instruction.

According to the present invention, however, print jobs are stored in a box in the form represented by Job-4 shown in FIG. 15 even if the same application document as Job-1 is used. Then, in response to a print instruction, prints are produced using a box print style table ("Binding" in this case) stored in the box. The resulting output looks like Job-4 shown in FIG. 14. Similarly, according to the prior art, print jobs are stored in a box in a form represented by Job-2 or Job-3 shown in FIG. 15 and outputted in a different print style represented by Job-2 or Job-3 shown in FIG. 13 in response to a print instruction. However, jobs are stored in a form represented by Job-5 or Job-6 shown in FIG. 15 even if the same application document is used. Then, in response to a print instruction, prints are produced using a common box print style table ("Binding" in this case) stored in the box. As a result, all outputs are produced in the same style as represented by Job-5 or Job-6 in FIG. 14.

Restrictions can be imposed selectively: for example, even if restrictions are imposed on the host 10 or output device 20, prohibiting duplex printing or color printing, any print style setting contained in a box specifying duplex printing or color printing can be used where duplex printing or color printing is permitted. For example, it is possible to specify a print style for presentation materials for visitors in a box and lift the restrictions only when presentation materials are printed. In this way, restrictions on use can be managed flexibly.

Besides, the information processing system including the information processing apparatus according to the present invention implements the functions of the embodiment described above by means of a computer which executes a control program read from a recording medium, but the present invention is not limited to this. Needless to say, the functions of this embodiment may also be implemented by part or all of the actual processing executed, in accordance with instructions from the control program, by an OS (operating system) running on the computer.

As the storage medium for supplying the program code, for example, a floppy disk, hard disk, optical disk, magneto-optical disk, CD-ROM (compact disk read only memory), CD-R (compact disk recordable), magnetic tape, non-volatile memory card, ROM chip, or the like may be used.

As described above, the information processing method and information processing apparatus according to this embodiment produce the following effects also when the box print function is used.

When the user outputs multiple items of print data dependent on the printer 20 in batches, a common print style is used automatically, improving the alignment and viewability of printed matter. Also, the reprinting operations conventionally required are reduced, resulting in improved working efficiency.

Also, when a single user has two or more hosts 10 and stores print jobs from them in a box 10, it is easy to store and output the print jobs always in the same style. Besides, there is no need to register and manage print styles on the hosts 10. This also improves working efficiency.

Furthermore, even when a single host 10 is shared by multiple users, since the printer 20 contains a box for each user and a print style table for each box, the users can be managed efficiently.

Other Embodiments

The present invention can also be implemented if the printer 20 is replaced by a plotter, copier, facsimile machine, or the like; the host 10 is replaced by a personal computer, workstation, minicomputer, or the like; the controllers 1010 and 2010 are replaced by software, ROMs, RAMS, or the like; the connectors 1020 and 2020 are replaced by serial interface boards, parallel interface boards, network interface boards, or the like; MEMs 1030 and 2030 are replaced by memory, magnetic disk, magneto-optical disk, magnetic tape, or other devices; the type of print unit 2040 is replaced by a laser beam, bubble jet, LED (light-emitting diode), thermal transfer, or other type; the display 1040 is replaced by a CRT (cathode ray tube), liquid crystal display, or the like; the input unit 1070 is replaced by a keyboard, mouse, track ball, or the like; the media reader 1050 is replaced by an FD (floppy disc) drive, MO (magneto-optical disk) drive, CD-ROM (compact disk read only memory) drive, IC (integrated circuit) memory card drive, or the like; and the recording medium 1060 is replaced by an FD (floppy disc), MO (magneto-optical disk), CD-ROM (compact disk read only memory), IC (integrated circuit) memory card, or the like.

As described above in detail, the information processing methods and information processing apparatus of the present invention provide improved alignment and viewability of printed matter and allow print jobs to be stored and output always in the same print style, resulting in improved working efficiency. Also, the storage medium and the program stored therein of the present invention allows smooth control of an information processing apparatus such as the one described above.

What is claimed is:

1. An information processing method carried out in an information processing apparatus capable of communicating with an output device having a plurality of box areas, to which respective print setting information is set, for storing received print data without printing the print data until a print instruction is given, said method comprising:

a setting step of setting print setting information to be applied to print data to be generated;

a specifying step of specifying a box area from the plurality of box areas;

a display control step of displaying the print setting information set to the box area specified in said specifying step;

a designation step of designating execution of a print process based on the print setting information displayed in said display control step; and a generating step of, when the execution of the print process is designated in said designated step, generating first print data which includes (a) instruction information for causing the output device to execute the print process based on the print setting information set to the box area specified in said specifying step and (b) the print setting information set in said setting step, and on the other hand, when the execution of the print process is not designated in said designation step, generating second print data based on the print setting information set in said setting step, wherein said generating step generates the first print data such that the output device executes the print process based on the print setting information set to the box area specified in said specifying step, without executing the print process based on the print setting information set in said setting step, in response to an instruction for printing the first print data stored in the specified box area.

2. A method according to claim 1, further comprising an obtaining step of obtaining the print setting information set to each box area.

3. A method according to claim 2, wherein said obtaining step obtains box names set to the respective box areas, and said display control step displays the obtained box names.

4. A method according to claim 3, wherein when one of the box names obtained in said obtaining step is specified in said specifying step, said obtaining step obtains the print setting information corresponding to the specified box name.

5. A method according to claim 1, wherein said generating step generates print data which includes information indicating a storage area which retains the print setting information set to the box area specified in said specifying step.

6. A method according to claim 2, wherein said obtaining step obtains the print setting information including at least one of sheet size setting information, N-up print setting information, duplex print setting information and binding margin setting information.

7. An information processing apparatus capable of communicating with an output device having a plurality of box areas, to which respective print setting information is set, for storing received print data without printing the print data until a print instruction is given, said apparatus comprising:
   a setting unit for setting print setting information to be applied to print data to be generated;
   a specifying unit for specifying a box area from the plurality of box areas;
   a display control unit for displaying the print setting information set to the box area specified by said specifying unit;
   a designation unit for designating execution of a print process based on the print setting information displayed by said display control unit; and
   a generating unit for, when the execution of the print process is designated by said designation unit, generating first print data which includes (a) instruction information for causing the output device to execute the print process based on the print setting information set to the box area specified by said specifying unit and (b) the print setting information set by said setting unit, and on the other hand, when the execution of the print process is not designated by said designation unit, generating second print data based on the print setting information set by said setting unit,
   wherein said generating unit generates the first print data such that the output device executes the print process based on the print setting information set to the box area specified by said specifying unit, without executing the print process based on the print setting information set by said setting unit, in response to an instruction for printing the first print data stored in the specified box area.

8. An apparatus according to claim 7, further comprising an obtaining unit for obtaining the print setting information set to each box area.

9. An apparatus according to claim 8, wherein said obtaining unit obtains box names set to the respective box areas, and said display control unit displays the obtained box names.

10. An apparatus according to claim 9, wherein when one of the box names obtained by said obtaining unit is specified by said specifying unit, said obtaining unit obtains the print setting information corresponding to the specified box name.

11. An apparatus according to claim 7, wherein said generating unit generates print data which includes information indicating a storage area which retains the print setting information set to the box area specified by said specifying unit.

12. An apparatus according to claim 8, wherein said obtaining unit obtains the print setting information including at least one of sheet size setting information, N-up print setting information, duplex print setting information and binding margin setting information.

13. A program embodied on a computer readable medium, executed by an information processing apparatus capable of communicating with an output device having a plurality of box areas, to which respective print setting information is set, for storing received print data without printing the print data until a print instruction is given, said program comprising:
   a setting step of setting print setting information to be applied to print data to be generated;
   a specifying step of specifying a box area from the plurality of box areas;
   a display control step of displaying the print setting information set to the box area specified in said specifying step;
   a designation step of designating execution of a print process based on the print setting information displayed in said display control step; and
   a generating step of, when the execution of the print process is designated in said designation step, generating first print data which includes (a) instruction information for causing the output device to execute the print process based on the print setting information set to the box area specified in said specifying step and (b) the print setting information set in said setting step, and on the other hand, when the execution of the print process is not designated in said designation step, generating second print data based on the print setting information set in said setting step,
   wherein said generating step generates the first print data such that the output device executes the print process based on the print setting information set to the box area specified in said specifying step, without executing the print process based on the print setting information set in said setting step, in response to an instruction for printing the first print data stored in the specified box area.

14. A program according to claim 13, further comprising an obtaining step of obtaining the print setting information set to each box area.

15. A program according to claim 14, wherein said obtaining step obtains box names set to the respective box areas, and said display control step displays the obtained box names.

16. A program according to claim 15, wherein when one of the box names obtained in said obtaining step is specified in said specifying step, said obtaining step obtains the print setting information corresponding to the specified box name.

17. A program according to claim 13, wherein said generating step generates print data which includes information indicating a storage area which retains the print setting information set to the box area specified in said specifying step.

18. A program according to claim 14, wherein said obtaining step obtains the print setting information including at least one of sheet size setting information, N-up print setting information, duplex print setting information and binding margin setting information.

* * * * *

UNITED STATES PATENT AND TRADEMARK OFFICE
CERTIFICATE OF CORRECTION

PATENT NO. : 7,307,742 B2 Page 1 of 1
APPLICATION NO. : 09/953255
DATED : December 11, 2007
INVENTOR(S) : Akihiko Noda It is certified that error appears in the above-identified patent and that said Letters Patent is hereby corrected as shown below:

<u>COLUMN 4</u>

Line 23, "Infor-" should read --infor- --.

<u>COLUMN 8</u>

Line 27, "S1709" should read --S1709.--.
Line 48, "1030," should read --1030.--.

<u>COLUMN 9</u>

Line 60, "time," should read --time.--.

<u>COLUMN 10</u>

Line 53, "Fig. 15" should read --Fig. 18--.

Signed and Sealed this

Eighteenth Day of November, 2008

JON W. DUDAS
*Director of the United States Patent and Trademark Office*